United States Patent
Yang et al.

(10) Patent No.: US 10,659,770 B2
(45) Date of Patent: May 19, 2020

(54) STEREO IMAGE DISPLAY APPARATUS

(71) Applicant: CheRay Co. Ltd., Hsinchu (TW)

(72) Inventors: Chun-Hsiang Yang, Hsinchu (TW);
Yi-Pai Huang, Hsinchu (TW);
Chih-Hung Ting, New Taipei (TW);
Kai-Chieh Chang, Kaohsiung (TW);
Jui-Yi Wu, Miaoli County (TW)

(73) Assignee: CHERAY CO. LTD., Hsinchu (TW)

( * ) Notice: Subject to any disclaimer, the term of this patent is extended or adjusted under 35 U.S.C. 154(b) by 65 days.

(21) Appl. No.: 15/959,348

(22) Filed: Apr. 23, 2018

(65) Prior Publication Data
US 2019/0222829 A1    Jul. 18, 2019

(30) Foreign Application Priority Data

Jan. 12, 2018  (TW) .............................. 107101244 A

(51) Int. Cl.
| | |
|---|---|
| G02B 27/22 | (2018.01) |
| H04N 13/00 | (2018.01) |
| H04N 13/322 | (2018.01) |
| G02B 27/09 | (2006.01) |
| H04N 13/307 | (2018.01) |
| H05B 45/00 | (2020.01) |

(52) U.S. Cl.
CPC ....... *H04N 13/322* (2018.05); *G02B 27/0961* (2013.01); *H04N 13/307* (2018.05); *H05B 45/00* (2020.01)

(58) Field of Classification Search
CPC ............... H04N 13/322; H04N 13/307; H05B 33/0803; G02B 27/0961

USPC .......................................................... 348/59
See application file for complete search history.

(56) References Cited

U.S. PATENT DOCUMENTS

| | | | |
|---|---|---|---|
| 2017/0219838 A1* | 8/2017 | Yang | ................... G02B 27/2242 |
| 2019/0149808 A1* | 5/2019 | Ng | ....................... H04N 13/305 348/59 |
| 2019/0346615 A1* | 11/2019 | Johnson | ................. G02B 5/045 |

FOREIGN PATENT DOCUMENTS

CN    105959672 A    9/2016

OTHER PUBLICATIONS

Hideki Kakeya, et. al, "A High Resolution Aerial 3D Display Using a Directional Backlight", Journal of Imaging Science and Technology, 060402-1-060402-8, Nov. 3, 2015.

* cited by examiner

*Primary Examiner* — Susan E. Hodges
(74) *Attorney, Agent, or Firm* — Li & Cai Intellectual Property (USA) Office

(57) ABSTRACT

A stereo image display apparatus includes a display device, a lens array layer and a directional structure. The display device includes display surface and an image algorithm unit. The lens array layer is disposed adjacent to the display surface of the display device. The lens array layer includes a plurality of lenses. The directional structure disposed between the display device and the lens array layer or disposed on the lens array layer. The directional structure enables light generated by the display device to emit directionally, and the lens array layer is configured to reconstruct an un-reconstructed image displayed by the display surface as an integral image to produce a stereo image, so that a better stereo image display effect can be provided.

4 Claims, 4 Drawing Sheets

STEREO IMAGE DISPLAY APPARATUS

BACKGROUND OF THE INVENTION

1. Field of the Invention

The present disclosure relates to an image display apparatus, and in particular, to a stereo image display apparatus adopting autostereoscopic 3-dimension (3D) display technique.

2. Description of Related Art

Generally, conventional stereo image display apparatuses mainly employ the binocular vision fusion imaging technology. Regarding to these kinds of image display apparatuses, either a user has to view a stereo image at a vertical viewing angle, or an image depth cannot be too far away from a display surface of the display apparatuses. When the stereo image display apparatuses are used in aviation terrain models, building models, and 3D medical training devices, the stereo image display apparatuses are generally placed horizontally. In this situation, an oblique viewing angle is natural to the user, but the conventional stereo image display apparatuses are incapable of providing a natural viewing angle, and thus are inconvenient to the user. Moreover, the conventional stereo image display apparatuses provide the user with visual stimuli in only one direction, i.e., either with the image advancing forward, or withdrawing backward. Therefore, the conventional stereo image display apparatuses cannot provide a vivid sensation that the image is escaping from the confines of a plane of the display surface and floating in mid-air. In addition, the conventional stereo image display apparatuses mostly have poor image display quality, which makes it difficult for them to provide a better stereo image display effect.

In this regard, the present disclosure provides a stereo image display apparatus to overcome the aforementioned drawbacks.

SUMMARY OF THE INVENTION

The main object of the present disclosure is to provide a stereo image display apparatus which displays a floating stereo image, allows a user to see the stereo image at a vertical viewing angle and an oblique viewing angle, improves the image display quality, collimates light generated by a display device of the stereo image display apparatus, so as to eliminate the lightof other orders and provide a better stereo image display effect.

To resolve the above technical problems, the present disclosure provides a stereo image display apparatus which includes: a display device including a display surface and an image algorithm unit, a lens array layer including a plurality of lenses and disposed adjacent to the display surface of the display device, and a directional structure disposed between the display device and the lens array layer or disposed on the lens array layer. The directional structure enables light generated by the display device to emit directionally, and the lens array layer is configured to reconstruct an un-reconstructed image displayed by the display surface as an integral image to produce a stereo image.

The present disclosure also provides a stereo image display apparatus, which includes: a display device including a display surface, an image algorithm unit and a plurality of light-emitting elements located at the display surface, and a lens array layer disposed adjacent to the display surface of the display device. The lens array layer includes a plurality of lenses, and the lenses correspond to the light-emitting elements, respectively. The lens array layer is configured to reconstruct an un-reconstructed image displayed by the display surface as an integral image to produce a stereo image.

The present disclosure also provides a stereo image display apparatus, which includes: a display device being a passive display and including a display surface, an image algorithm unit and a directional backlight layer, and a lens array layer disposed adjacent to the display surface of the display device. The lens array layer includes a plurality of lenses. The directional backlight layer includes a directional structure. The directional backlight layer is configured to generate directional light, and the lens array layer is configured to reconstruct an un-reconstructed image displayed by the display surface as an integral image to produce a stereo image.

The advantage of the present disclosure is that the stereo image display apparatus includes a directional structure which is disposed between the display device and the lens array layer, disposed on the display device or disposed on the lens array layer so as to improve the image display quality, enable the light generated by the display device to emit directionally, eliminate the light of other orders, and provide a better stereo image display effect.

For further understanding of the present disclosure, the following embodiments are provided to facilitate the disclosure of the present disclosure.

DETAILED DESCRIPTION OF PREFERRED EMBODIMENTS

The aforementioned illustrations and following detailed descriptions are exemplary for the purpose of further explaining the scope of the instant disclosure. Other objectives and advantages related to the instant disclosure will be illustrated in the subsequent descriptions and appended

First Embodiment

The present disclosure provides a stereo image display apparatus, which can be used in many industries such as optoelectronics, medical, military, exhibition, display, education, entertainment, and consumer electronics. The stereo image display apparatus can be used in active or passive stereo image display apparatus, but the present disclosure is not limited thereto.

Figure 1:
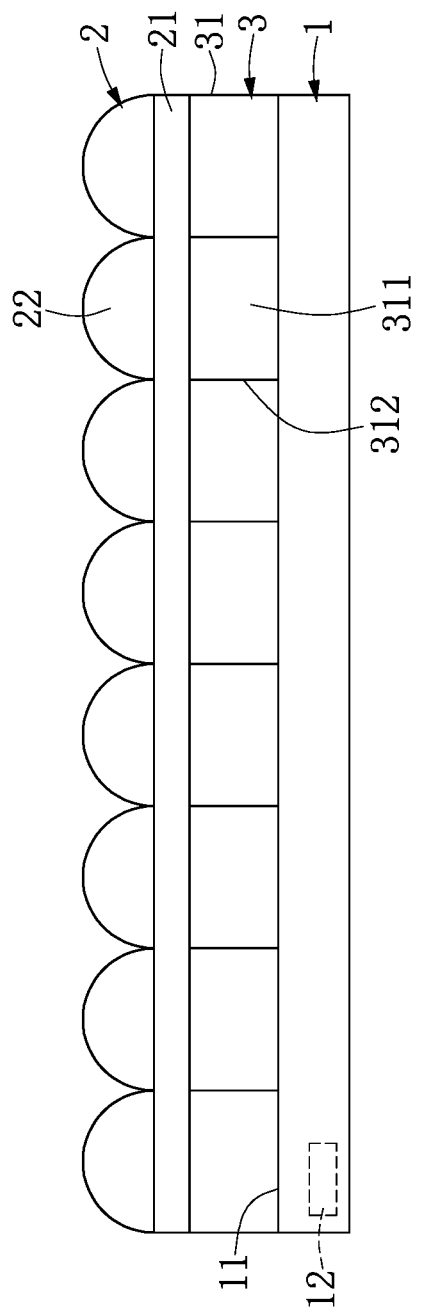
FIG. 1 is a planar view showing a stereo image display apparatus according to a first embodiment of the present disclosure.

Referring to FIG. 1, the stereo image display apparatus includes a display device 1, a lens array layer 2, and a directional structure 3. The stereo image display apparatus can alter a stereo image that a user sees by altering a displayed image so that the user can see the stereo image at different viewing angles.

The display device 1 can be a typical flat panel display. The display device 1 includes display surface 11 for displaying an image. The lens array layer 2 is disposed adjacent to the display surface 11 of the display device 1, and the lens array layer 2 is preferably disposed above the display device 1. The lens array layer 2 can be arranged in contact with the display surface 11 of the display device 1. The lens array layer 2 can also be arranged spaced apart from the display surface 11 of the display device 1. In addition, a middle layer can be disposed between the display surface 11 of the display device 1 and the lens array layer 2.

The display device 1 is located at a bottom layer (i.e. a lower layer) of the stereo image display apparatus and is configured to display an un-reconstruction planar image that has not been reproduced. The planar image can be reconstructed as an integral image by the lens array of the lens array layer 2 so that a 3D stereo image can be reproduced. Moreover, the display device 1 disposed on the bottom layer is configured to display a target image. Therefore, the display device 1 can be any types of hardware including, but not limited to, a mobile phone, a tablet, a flat panel display, a printed image, an engraved image, or a projection display image. In addition, the display device 1 can also be a self-luminous display or a passive display.

The lens array layer 2 is located at a top layer (i.e. an upper layer) of the stereo image display apparatus and has a function of controlling the light field. The lens array layer 2 is configured to control an angle of light of a three-dimensional object and is configured to reconstruct the un-reconstruction planar image on the display surface 11 so that the user can see a 3D stereo image. The curvature of each lens 22 of the lens array layer 2 is determined by the material of the each lens 22. The curvatures of the lenses 22 of the lens array layer 2, as well as the combination of the lenses 22 and the display device 1 located at the bottom layer, determine the height, the range of viewing angle and the clarity of the 3D stereo image.

In the present embodiment, the lens array layer 2 is made of a material with good optical characteristics, which includes, but is not limited to, polymethylmethacrylate (PMMA), polycarbonate (PC), polyethylene (PE), glass and other light-transmitting materials. The lens array layer 2 includes a base 21 and a plurality of lenses 22. The lenses 22 are disposed on a surface of the base 21. That is, the lenses 22 are disposed on a surface of the base 21 away from the display device 1, but the arrangement and the structure of the lens array layer 2 are not limited to the present embodiment. Moreover, the lenses 22 have a function of focusing light, and the lens array layer 2 is configured to reconstruct an un-reconstructed image displayed by the display surface 11 as an integral image to produce a stereo image.

A conventional naked-eye 3D stereo image display apparatus has a viewing angle problem so that the user cannot see the stereo image at an oblique viewing angle. More specifically, when the user 5 is in front of the display device 1 (i.e., zero order viewing zone), the display device 1 has a limited viewing angle zone for the user. Once the user's sight is out of the viewing angle zone, the user will not see the correct stereo image corresponding to the viewing angle of the user. On the contrary, the main feature of the present disclosure is that even when the user is not in front of the display device 1, the user can still see the correct 3D stereo image at an oblique viewing angle. In order to allow the user to see the correct stereo image at the oblique viewing angle, the present embodiment employs an oblique angle image display method instead of a zero order (forward) image display method. That is, the paths of the light will be converged in an oblique direction so that the user can see the correct stereo image at the oblique viewing angle. It should be noted that the stereo image display apparatus of the present disclosure also allows the user to see the correct stereo image at a vertical viewing angle.

The display device 1 in the present disclosure can be of any specification as long as it can be applied with an image algorithm. In other words, the display device 1 includes an image algorithm unit 12 including the image algorithm. The image used in the display device 1 is calculated by the image algorithm. This calculation is matched to the configuration of the lens array layer 2, which predicts the various possible paths of the light, thereby calculating the relative position of the image.

The directional structure 3 can be disposed between the display device 1 and the lens array layer 2. The directional structure 3 can also be disposed on (or formed on) the display device 1 or the lens array layer 2. The directional structure 3 enables the light generated by the display device 1 to emit directionally to the lens array layer 2 so as to improve the image display quality, eliminate the light of other orders, and provide a better stereo image display effect. The directional structure 3 can limit the emission of the light within a predetermined angle in left and right directions (control angle) and in front and rear directions (oblique angles) so as to eliminate the light of other orders.

In the present embodiment, the directional structure 3 is disposed between the display device 1 and the lens array layer 2. The directional structure 3 is a baffle layer 31. The baffle layer 31 corresponds to the display surface 11 of the display device 1 and the lens array layer 2. The baffle layer 31 is plate-shaped, the baffle layer 31 has a plurality of light transmitting portions 311, and the light transmitting portions 311 correspond to the lenses 22, respectively. In a top view of the stereo image display apparatus, the lenses 22 are circle-shaped or ellipse-shaped, and the light transmitting portions 311 are circle-shaped, ellipse-shaped or rectangle-shaped. Moreover, each of the light transmitting portions 311 can have a hollow structure, but the present disclosure is not limited thereto. For example, each of the light transmitting portions 311 can have a solid structure by filling a light-transmitting material into the hollow structure. The directional structure 3 further includes a plurality of shielding walls 312, each being disposed around a peripheral part of each of the light transmitting portions 311, respectively, and each of the shielding walls 312 is made of an opaque material. Each of the shielding walls 312 is vertical or oblique to the display surface 11 of the display device 1. The shielding walls 312 can provide a light shielding effect.

Therefore, the light generated by the display device 1 can emit directionally to the lens array layer 2 so as to eliminate the light of other orders and provide a better stereo image display effect.

Figure 2:
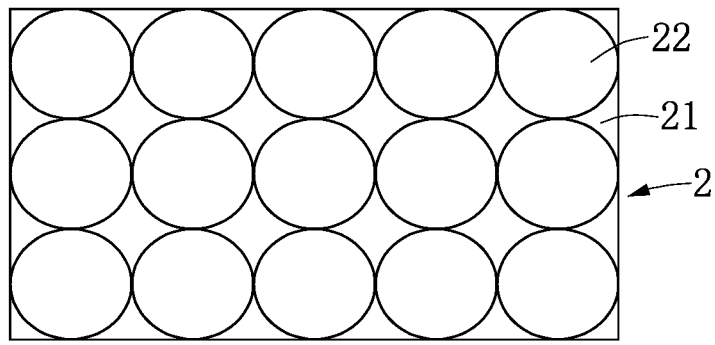
FIG. 2 is a planar view showing a lens array layer arranged in an aligned arrangement in the stereo image display apparatus according to the first embodiment of the present disclosure.
Figure 3:
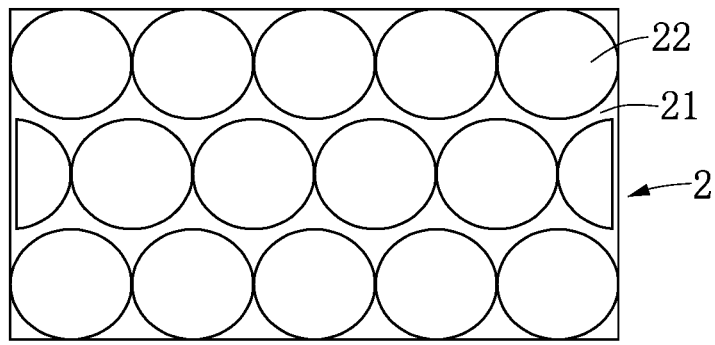
FIG. 3 is a planar view showing the lens array layer arranged in an staggered arrangement in the stereo image display apparatus according to the first embodiment of the present disclosure.

The lens array layer 2 of the present disclosure has a significant correlation to the display effect. Referring to FIG. 2 and FIG. 3, the lens array layers 2 can be arranged in a rectangular arrangement or a hexagonal arrangement, that is, the lenses 22 in each two adjacent columns are arranged in an aligned arrangement (FIG. 2) or in a staggered arrangement (FIG. 3). Further, each of the arrangements can be used to produce a 3D stereo image.

Figure 4:
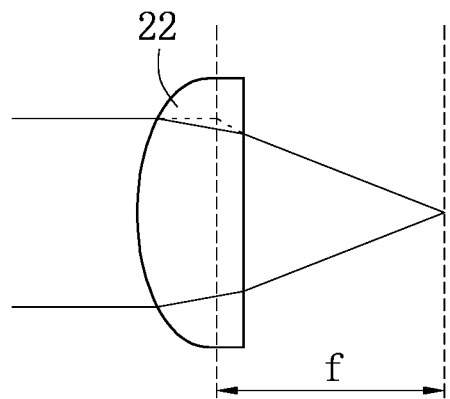
FIG. 4 is a schematic view showing a single lens which is focusing light in the stereo image display apparatus according to the first embodiment of the present disclosure.

The lenses 22 on the lens array layer 2 are the microstructures having the light focusing function. The light focusing function of each lens 22 can be determined according to the refractive index (n value) of its material. Each of the lenses 22 transmits light having a wavelength range of 300 nm to 1100 nm. Each of the lenses 22 conforms to Lensmaker's equation (FIG. 4): $1/f=(n-1)(1/R1+1/R2)$, in which R1 and R2 are the respective radiuses of curvature of bilateral surfaces of the lens 22, f is the focal length of the lens 22, and n is the refractive index of the lens 22. In addition, each of the lenses 22 has a diameter of 100 um to 5 mm, which is adapted to the pixel size of different display devices.

Accordingly, the present disclosure provides a stereo image display apparatus which can be applied to a vertical viewing angle and an oblique viewing angle. The stereo image display apparatus, in conjunction with the hardware arrangement, controls the direction of the light emitted from each pixel in the display device 1 through the optical element. The hardware system of the present disclosure includes relative simple optical elements, such as the display device 1, the lens array layer 2 and the directional structure 3, which can be packaged into a package. Also, the hardware system can be configured to display a realistic stereo image in mid-air by virtue of the designed pixel size, system gap, lens size and focal length, and by virtue of the integral image principle in cooperation with the screen output signal calculated by the particular algorithm. In terms of hardware, the stereo image display apparatus of the present disclosure requires only a display device 1, a lens array layer 2 and a directional structure 3 to achieve the floating stereo image without using other optical films, thereby providing a relative simple structure.

Second Embodiment

Figure 5:
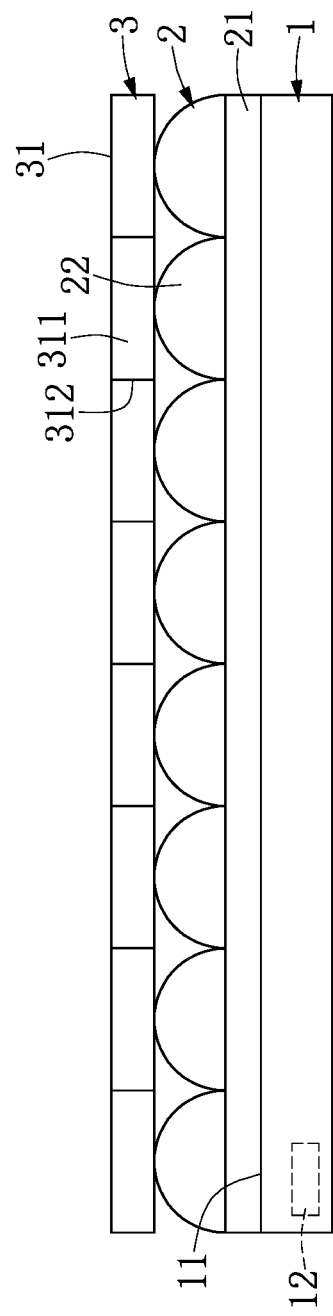
FIG. 5 is a planar view showing a stereo image display apparatus according to a second embodiment of the present disclosure.

Referring to FIG. 5, which is a second embodiment of the present disclosure. The stereo image display apparatus of the present embodiment includes a display device 1, a lens array layer 2 and a directional structure 3. The lens array layer 2 includes a base 21 and a plurality of lenses 22. The lenses 22 are disposed on a surface of the base 21. The lens array layer 2 is disposed adjacent to the display surface 11 of the display device 1. The lens array layer 2 is arranged in contact with the display surface 11 of the display device 1. The directional structure 3 is disposed on the lens array layer 2. The directional structure 3 is a baffle layer 31. The baffle layer 31 corresponds to the lens array layer 2. The baffle layer 31 is plate-shaped, the baffle layer 31 has a plurality of light transmitting portions 311, and the light transmitting portions 311 correspond to the lenses 22, respectively. The directional structure 3 further includes a plurality of shielding walls 312, each being disposed around a peripheral part of each of the light transmitting portions 311, respectively, and each of the shielding walls 312 is made of an opaque material. Each of the shielding walls 312 is vertical or oblique to the display surface 11 of the display device 1. The shielding walls 312 can provide a light shielding effect. Therefore, the light generated by the display device 1 can emit directionally to the air so as to eliminate the light of other orders and provide a better stereo image display effect.

Third Embodiment

Figure 6:
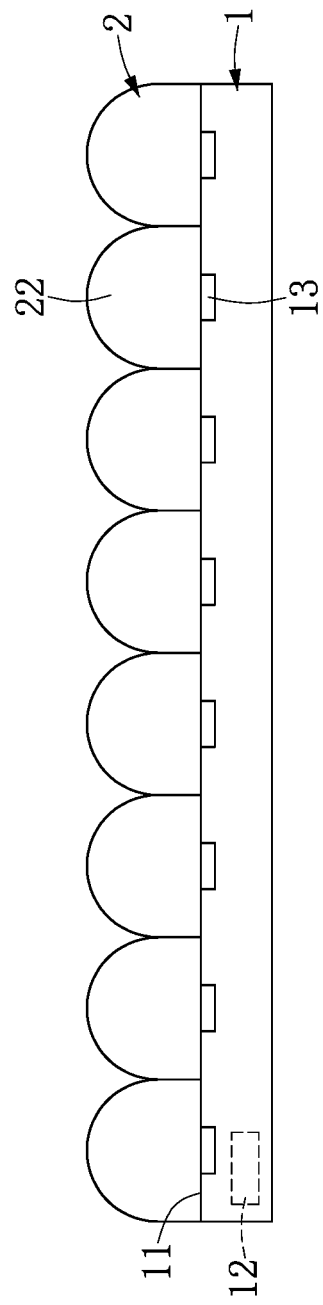
FIG. 6 is a planar view showing a stereo image display apparatus according to a third embodiment of the present disclosure.

Referring to FIG. 6, which is a third embodiment of the present disclosure. The stereo image display apparatus of the present embodiment includes a display device 1 and a lens array layer 2. The display device 1 is a self-luminous display which includes a plurality of light-emitting elements. The light-emitting elements are preferably directional light-emitting elements 13. The directional light-emitting elements 13 are located at the display surface 11. The directional light-emitting elements 13 may be, for example, Light-emitting Diodes (LEDs), Micro LEDs or Organic Light-emitting Diodes (OLEDs). The lens array layer 2 includes a plurality of lenses 22, and the lenses 22 have the light focusing function. The lens array layer 2 is disposed adjacent to the display surface 11 of the display device 1. More specifically, the lenses 22 are arranged in contact with the display surface 11 of the display device 1, and the lenses 22 correspond to the directional light-emitting elements 13, respectively. The lenses 22 can be respectively and directly formed on the directional light-emitting elements 13. The directional light-emitting elements 13 can form a directional structure. Therefore, the light generated by the display device 1 can emit directionally to or can be collimated to the lens array layer 2 so as to eliminate the light of other orders and provide a better stereo image display effect. In another embodiment of the present disclosure, the directional light-emitting elements 13 can have the function of controlling the light field as the lens array layer 2 so that the lens array layer 2 can be omitted.

Fourth Embodiment

Figure 7:
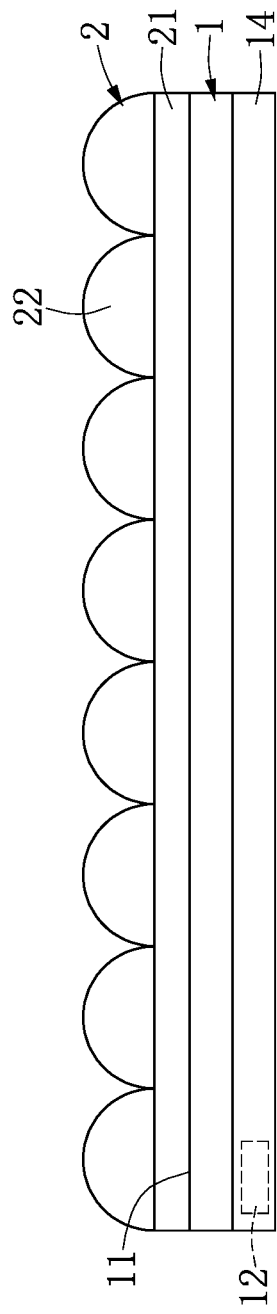
FIG. 7 is a planar view showing a stereo image display apparatus according to a fourth embodiment of the present disclosure.

Referring to FIG. 7, which is a fourth embodiment of the present disclosure. The stereo image display apparatus of the present embodiment includes a display device 1 and a lens array layer 2. The display device 1 is a passive display, such as a passive liquid crystal display (LCD). The display device 1 includes a directional backlight layer 14. The lens array layer 2 includes a base 21 and a plurality of lenses 22. The lenses 22 are disposed on a surface of the base 21, and the lens array layer 2 is disposed adjacent to the display surface 11 of the display device 1. The directional backlight layer 14 of the display device 1 can form a directional structure. Therefore, the light generated by the directional backlight layer 14 of the display device 1 can emit directionally to the lens array layer 2 so as to eliminate the light of other orders and provide a better stereo image display effect.

Fifth Embodiment

Figure 8:
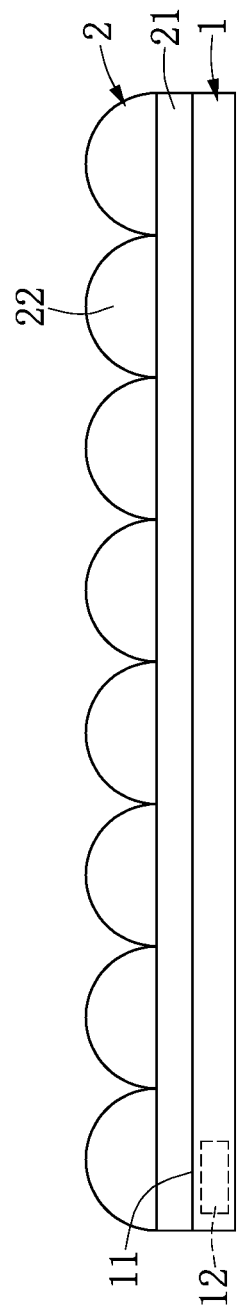
FIG. 8 is a planar view showing a stereo image display apparatus according to a fifth embodiment of the present disclosure.

Referring to FIG. 8, which is a fifth embodiment of the present disclosure. The stereo image display apparatus of the present embodiment includes a display device 1 and a lens array layer 2. The display device 1 is a self-luminous display which can generate directional light. The display device 1 may be a LED display, a Micro LED display, or an OLED display. The lens array layer 2 includes a base 21 and a plurality of lenses 22. The lenses 22 are disposed on a surface of the base 21, and the lens array layer 2 is disposed adjacent to the display surface 11 of the display device 1. The display device 1 can generate the directional light and can form a directional structure. Therefore, the light generated by the display device 1 can emit directionally to the lens array layer 2 so as to eliminate the lightof other orders and provide a better stereo image display effect.

The descriptions illustrated supra set fifth the preferred embodiment of the present disclosure; however, the characteristics of the present disclosure are by no means restricted thereto. All changes, alterations, or modifications conveniently considered by those skilled in the art are deemed as encompassed within the scope of the present disclosure delineated by the following claims.

What is claimed is:

1. A stereo image display apparatus, comprising:
    a display device including a display surface and an image algorithm unit;
    a lens array layer disposed adjacent to the display surface of the display device, and including a plurality of lenses; and
    a directional structure disposed between the display device and the lens array layer or disposed on the lens array layer,
    wherein the directional structure enables light generated by the display device to emit directionally, and the lens array layer is configured to reconstruct an un-reconstructed image displayed by the display surface as an integral image to produce a stereo image,
    wherein the directional structure is a baffle layer, the baffle layer is plate-shaped, the baffle layer has a plurality of light transmitting portions, the light transmitting portions correspond to the lenses, respectively, each of a plurality of shielding walls is disposed around a peripheral part of each of the light transmitting portions, respectively, and each of the shielding walls is vertical or oblique to the display surface of the display device, and
    wherein each of the light transmitting portions is a solid structure by filling a light-transmitting material;
    wherein the directional structure has a first side face facing the lens array layer and a second side face that is opposite to the first side face, and the first side face and the second side face are flat, respectively;
    wherein two ends of each of the shielding walls respectively extend to two side edges facing the display device and the lens array layer, so that the light generated by the display device is capable of emitting directionally to the solid structure.

2. The stereo image display apparatus according to claim 1, wherein each of the lenses transmits light having a wavelength range of 300 nm to 1100 nm, each of the lenses has a diameter of 100 um to 5 mm, and each of the lenses conforms to Lensmaker's equation: $1/f=(n-1)(1/R1+1/R2)$, wherein R1 and R2 are respective radiuses of curvature of bilateral surfaces of each of the lenses, f is a focal length of each lens, and n is a refractive index of each lens.

3. The stereo image display apparatus according to claim 1, wherein the display device is a self-luminous display.

4. The stereo image display apparatus according to claim 1, wherein the display device is a passive display.

* * * * *